United States Patent Office

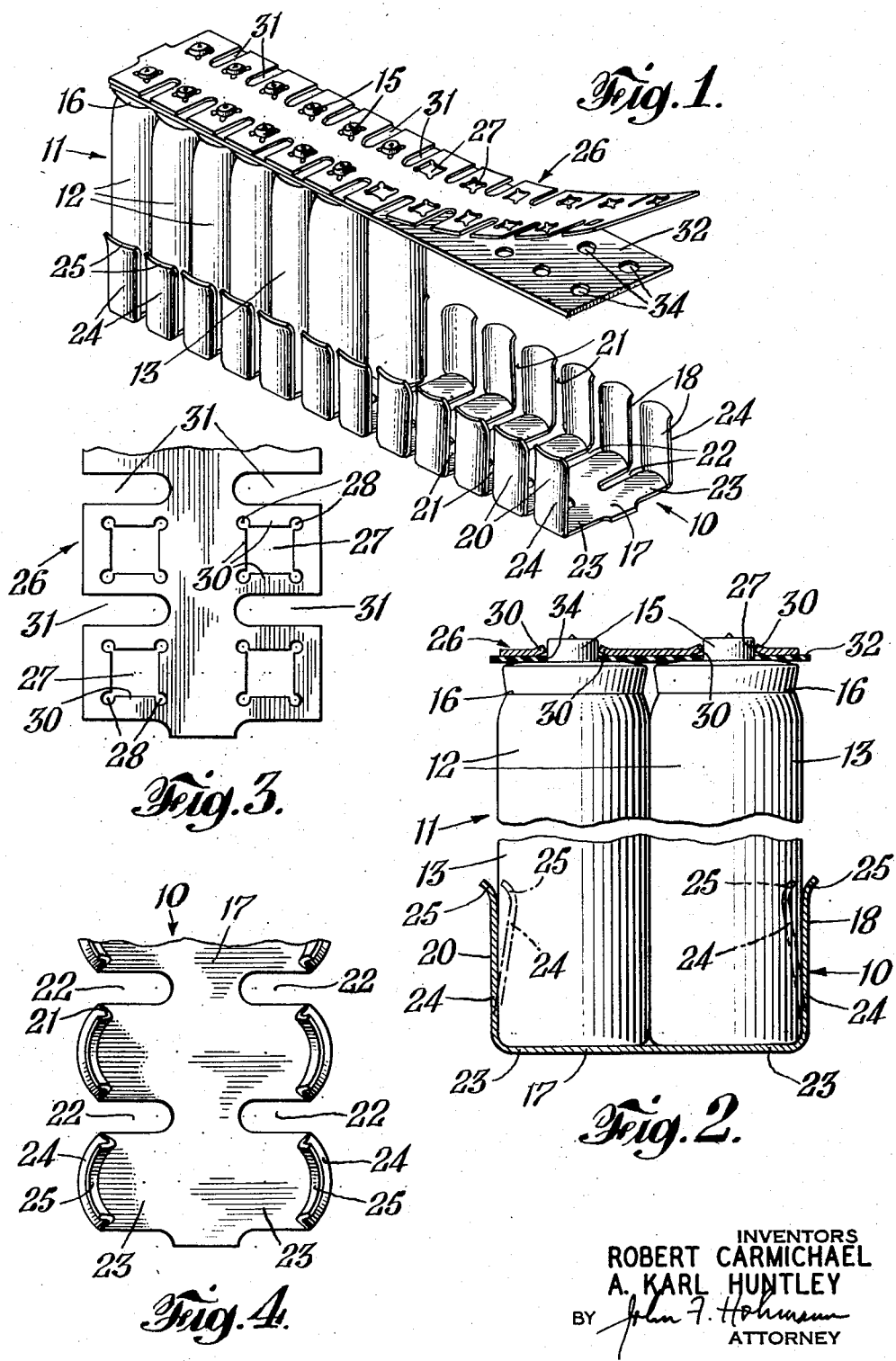

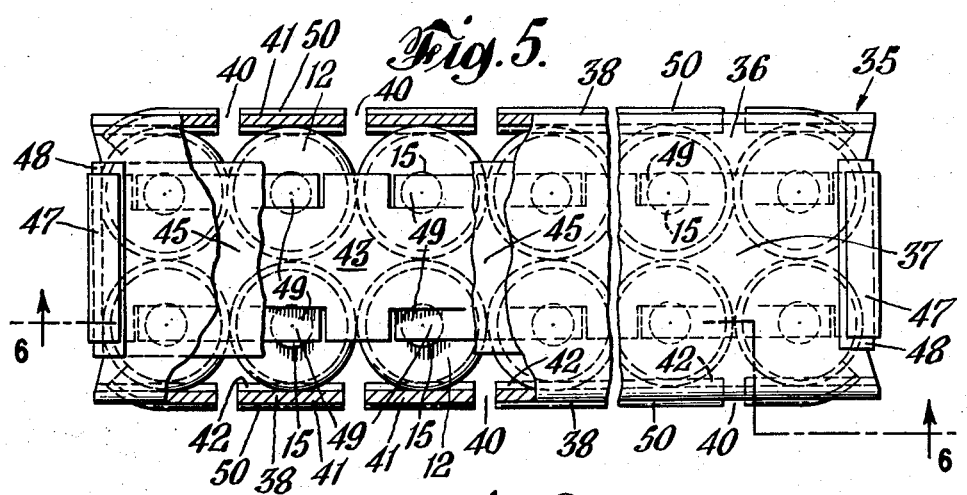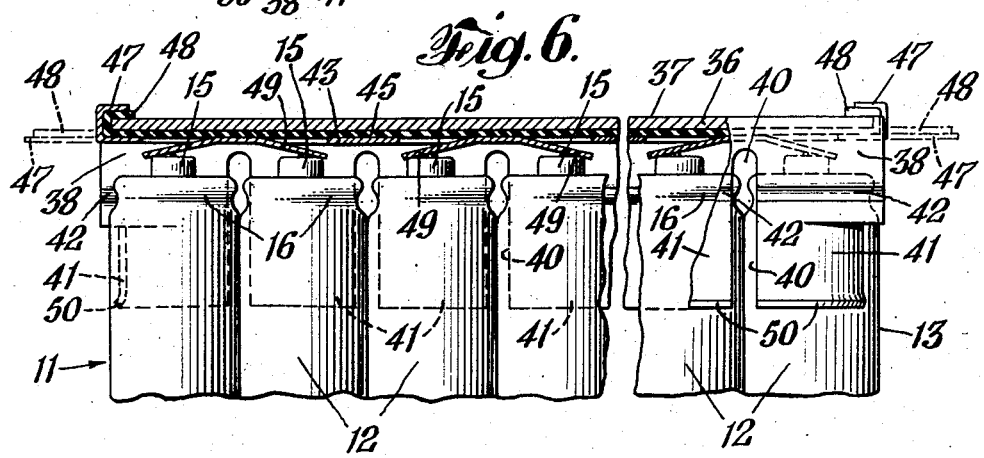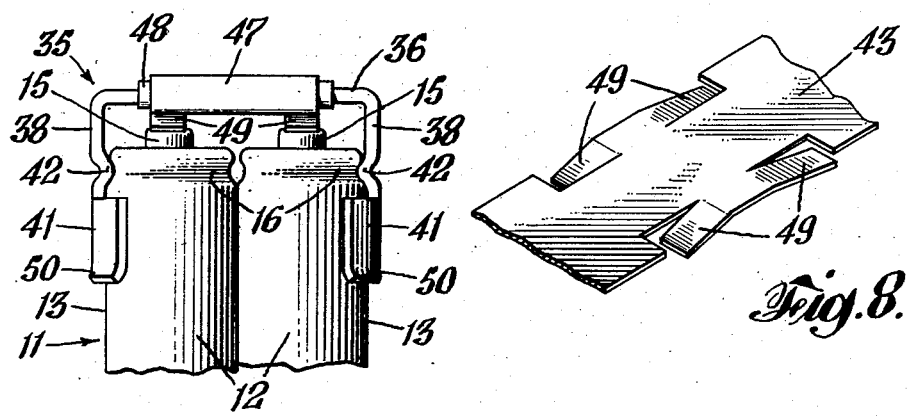
INVENTORS
ROBERT CARMICHAEL
A. KARL HUNTLEY
BY John F. Hohmann
ATTORNEY

2,901,526
Patented Aug. 25, 1959

2,901,526

BATTERY CONNECTOR

Alton Karl Huntley and Robert Carmichael, Lakewood, Ohio, assignors to Union Carbide Corporation, a corporation of New York Application May 26, 1954, Serial No. 432,453

6 Claims. (Cl. 136—135)

This invention relates to an improved mechanical type cell connector for retaining a group of primary galvanic cells in assembly and in electrical contact with each other.

Soldering connecting wires to the electrodes of multiple dry cells has long been used as a means for forming an electrical circuit between dry cells. But because the operation of soldering multiple connections is time-consuming and costly, this method of electrically joining cells together is not entirely satisfactory.

In order that dry cells may be electrically joined by means other than soldering without affecting cell performance, improved mechanical battery attachments are necessary. For the accomplishment of this purpose, it is desirable to provide improved apparatus suitable for holding a variable number of dry cells. The apparatus must be simple and inexpensive, and capable of retaining a group of cells in any assembly pattern that may be desired. It must be abe to provide good electrical contact between the cells under adverse circumstances, such as vibration. It must be suitable for use in connection with differently shaped cells.

It is, therefore, an object of the present invention to provide novel apparatus for effecting electrical contact between the cells of a cell assembly without the use of soldering or other heat-requiring method.

Another object of the present invention is to provide in an assembly of cells improved resilient means cooperating with the cells for holding the cells in assembled relation.

A further object of the present invention is to provide in an assembly of cells novel retention means for affording electrical contact between the cells.

Yet another object of the present invention is to provide in a cell assembly a cell cap contactor in combination with a cell wall contactor, wherein said contactors coact with said cell assembly to resiliently retain same in assembled relation and at the same time are effective in electrically connecting said assembly in parallel.

The invention is illustrated in the accompanying drawings in which:

Fig. 1 is a perspective view of a battery assembled in accordance with the principles of the present invention;

Fig. 2 is an enlarged transverse sectional view of the apparatus shown in Fig. 1;

Fig. 3 is an enlarged plan view of a portion of the cell cap contactor employed in the present invention;

Fig. 4 is an enlarged plan view of a portion of the cell wall contactor employed in the present invention;

Fig. 5 is a plan view of a modification of the cell holder of the present invention;

Fig. 6 is a partial sectional view taken along the line 6—6 in Fig. 5;

Fig. 7 is a partial end elevational view of the modified cell holder; and

Fig. 8 is an enlarged fragmentary perspective view showing details of the cell cap contactor in the modified cell holder.

In Fig. 1 a cell connector or holder clip 10 embodying features of the present invention is adapted to be applied to a cell assembly or battery unit 11 of dry cells 12 for retaining the cells in assembled relation. Any number of cells may be employed in any cell arrangement that may be desired, a double row cell pack, having six cells in each row being illustrated in the drawing.

Each of the dry cells 12 preferably comprises a conventional type dry cell having an outer cylindrical casing wall 13 constituting one terminal of the cell, and a cell cap or terminal 15 projecting from the top of the cell. Adjacent the top of the cell, the cell wall 13 has a reinforcing annular groove 16.

In a preferred construction, the cell connector 10 may be formed from a single sheet of electrically conductive material such as spring brass, Phosphor bronze, or other similar material. As illustrated in Fig. 1, the connector 10 is generally U-shaped, comprising a flat, elongated base or bight portion 17 having upturned longitudinal ends 18 and 20, which form the cell retaining walls of the cell holder. The walls 18, 20 of the holder 10 are shaped to conform to the curvature of the cell walls 13, and are disposed in assembly with the cells 12 in nesting engagement with the outer peripheral surface walls of the cells. From the outer side of the cell holder, the cell walls 18 and 20 appear as a parallel series of opposed outwardly-facing, convex, semicylindrical surfaces.

According to the present invention, the cell connector 10 is constructed to positively retain a group of cells 12 in relatively fixed relation to each other, and to provide improved mechanical means for electrically joining the cell wall terminals 13 to form part of a parallel electrical circuit. For this purpose each of the cell connector retaining walls 18 and 20 is provided with a plurality of longitudinally spaced, vertically disposed slots 21, which separate contiguous, convex surfaces of the holder walls from each other. Communicating with the slots 21 at juncture of the respective upturned ends 18 and 20 and the base 17 are slots 22 transversely disposed in the base 17 and terminating just short of the centerline thereof. These slots 21 and 22 appear as L slots, and define a plurality of longitudinally spaced L-shaped retaining members, each having a short, stiff base leg 23 and a semicylindrical, vertically-disposed, resilient cell-retaining leg 24. As a result of this construction, each of the retaining members 24 resiliently urges its associated cell 12 into engagement with its adjacent cell. Because the cell-retaining legs 24 conform to the curvature of the cells, a large area of contact is afforded between the cell holder 10 and the cell walls of the individual cells. Thereby, a low-resistance electrical path is provided between the casing wall terminals 13 of the cell assembly 11.

Facility in assembling the battery of cells is afforded by providing a reinforcing lip 25 at the upper terminal portion of each of the cell retaining legs 24. This may be conveniently accomplished by out-turning the terminals of the retaining members 24. Referring to Fig. 2, it will be seen that the retaining legs 24 extend inwardly at a slight angle to the vertical. As a consequence, the cells 12 may be guidingly inserted into the cell holder 10, and the retaining legs 24 flexed from the dotted outline position to the solid outline position, to retain flexibly and resiliently the cells in assembled relation.

In the present invention provision is made for connecting the cells 12 in parallel relation. For completing the parallel circuit of the cells 12, the cap terminals 15 must be electrically joined to a common conducting member. Accordingly, as a feature of the present invention, completion of the parallel circuit of the cells 12 is accomplished by providing as a cell cap contactor, a contactor strip or plate 26.

The contactor plate 26 is formed of an electrically conductive spring metal material or the equivalent. Preferably the contactor is rectangularly shaped and disposed in final assembly in superimposed relation to the cell assembly 11. Openings 27 in the contactor 26 are arranged in registering and axial alignment with the cell caps 15. As shown in Fig. 3, these contactor openings 27 are preferably square with the side dimension slightly smaller than the cell cap diameter.

For attaching the contactor strip 26 to the terminal caps 15, and in this instance to provide non-slip electrical contact with the cell caps, the contactor strip is constructed to be retained in resiliently biting contact with the cell caps. To this end, short radial slits or notches 28 are provided at the corners of each of the openings 27 in the contactor 26 to define oppositely-facing, deflectable, resilient, cell-contacting flanges 30.

For the purpose of rendering the contactor strip 26 flexibly conformable with the upper uneven surface of the cell assembly 11, the contactor is provided with a plurality of elongated slots 31. These slots 31 correspond in number, arrangement and alignment to the slots 22 in the contactor bight 17.

Interposed between the contactor 26 and the top of the cell assembly 11 is an insulating sheet 32. The insulating sheet 32 comprises a rectangular sheet of non-conducting material formed to overlie the top of the cell assembly. Longitudinally and transversely aligned apertures 34 in the insulating sheet are provided in registered alignment with the cell caps 15, so that in assembly the caps extend through the respective insulator openings, and the insulator rests on top of the cells. The insulator is of suitable thickness to permit the cell caps 15 to project sufficiently above the upper insulator surface to provide suitable contact area for the attachment of the contactor 26.

Attachment of the contactor 26 to the battery is accomplished by positioning the contactor over the battery so that the contactor openings 27 are visually aligned with the cell caps.

Upon the application of downward pressure to the contactor 26, the flexibly resilient flange portions 30 are upwardly cammed by the protruding cell caps 15. Further downward movement causes further upward deflection of the flange portions 30 until the cell contacting flange edges are either tangential to, or in contact with, the vertical sides of the cell caps. Continued downward movement of the contactor produces a downward sliding movement of the deflectable flange edges along the vertical walls of the cell caps 15 until the contactor is in assembled position, that is, in engagement with the insulating sheet 32.

The tension of the contactor flanges 30 occasioned by the protrusion of the cell caps is manifested in a reactive force which acts to force the flange edges into flexibly resilient and biting engagement with the cylindrical surface of the cell caps 15. Thus, any selective downward movement of the cell caps, such as might occur as a result of impact or other vibratory causes, tends to accentuate the biting action of the flange edges. As a consequence, the contactor 26 resists any forces tending to dislodge it from electrical contact with the cell caps, and continuous electrical contact is assured.

In the modification shown in Fig. 5, the functions of the cell cap and of the cell wall contactors are cooperatively arranged and combined into a unitary structure. As shown in the drawing, see Figs. 5, 6 and 7, a battery attachment or connector 35, composed of suitable light gauge, electrically-conductive, spring material, comprises an inverted U-shaped cell holder 36 having an elongated medial or bight portion 37 and a pair of depending arms 38. Suitably spaced slots 40 in each of the arms 38 define a plurality of cell retaining fingers 41 substantially similar to the resilient cell retaining members 24 previously described in Fig. 1.

In assembly with the battery of cells 12, the cell holder 36 overlies the cell assembly 11 with the medial portion 37 thereof disposed in spaced relation to the cell caps 15, the arms 38 resiliently retaining the cells 12 in block assembly.

A longitudinal reinforcing rib 42 in each of the arms 38 is adapted to be snapped into engagement with the reinforcing groove 16 in each of the cells 12 respectively. Thereby, flexibly resilient, self-retaining, conductive contact between all of the cells is effected.

As illustrated in Fig. 6, the medial portion 37 of the cell holder 36 is disposed in predetermined spaced relation to the cell assembly 11. Carried by the holder 36 is a cell cap or terminal contactor 43. An insulating strip 45 separates the terminal contactor 43 from the holder 36.

The contactor 43 is made of electrically-conductive, spring metal of suitable gauge thickness. Both the contactor 43 and the insulator 45 are preferably of rectangular form, slightly narrower than the cell holder 36 and slightly longer than the length thereof. Terminal portions 47, 48 at respective ends of the cell cap contactor 43 and the insulating strip 45, overhang each end of the holder 36.

Attachment of the contactor 43 and the insulating strip 45 to the holder 36 is effected by upturning the respective terminal portions 47 and 48 and folding them from the dotted outline position to the solid outline position shown in Fig. 6, so as to overlie the terminal margins of the medial portion 37 of the holder 36. A plurality of downwardly extending, flexibly resilient contacting flanges or wings 49, see Fig. 8, struck out from the body of the contacting strip 43 in a downward direction are properly disposed to register respectively with the cell caps 15 of the cell assembly 11 to effect contact therebetween.

Outwardly and downwardly divergent terminal lips 50 on each of the cell retaining fingers 41 of the cell holder facilitate the initial positioning of the battery attachment 35 prior to assembly, and avoid scraping contact during the assembly thereof.

By virtue of the above construction, the cells 12 may be connected in parallel, and, at the same time, resiliently held in assembled relation.

In assembling the cell block in accordance with the present invention, the cells 12 are held in a jig (not shown), in any desired arrangement, preferably in double row pattern with the cell caps 15 facing upwardly. Initially, the battery attachment 35 is placed over the cells so that the terminal lips 50 of the retaining fingers 41 rest on the upper edges of the cell walls 13. Upon the application of a moderate downward pressure, the ribs 42 move past the upper cell edges, and by force of the resiliency of the fingers 41, snap into nesting engagement with the respective annular cell grooves 16. As the holder snaps into home position, the wings 49 are flexed and resiliently tensioned to insure positive electrical contact with the cap terminals 15.

Modifications and variations may be effected without departing from the scope of the novel concepts of the present invention.

What is claimed is:

1. Apparatus for electrically connecting and retaining a battery of cells having cell walls and upwardly projecting cell caps as cell terminals thereof, the apparatus comprising a cell holder having a plurality of resilient elements for simultaneously retaining said cells in adjustably fixed position and affording resilient means for establishing conductive contact between the walls of the cells, a cell cap contactor having a plurality of flexibly bendable elements integral therewith, said bendable elements coacting with said cell caps to provide a common conductive contact therebetween, and an insulating strip between said contactor and said holder.

2. Apparatus for electrically joining and retaining a battery of cells in assembly when the cells are stripped of their insulating cover, the apparatus comprising a generally U-shaped holder of electrically conductive material having a substantially flat base and a plurality of flexibly resilient, cell retaining fingers for urging said cells into wall contact with each other and holding said cells in relatively fixed position, a cell cap contactor of electrically conductive material for establishing contact between the cell caps of said battery, the contactor including a plurality of flexibly bendable flanges so constructed and arranged as to be cammed by said battery cell caps into flexibly resilient engagement therewith to afford a common electrical contact therefor, and insulating material separating said holder from said contactor.

3. A battery attachment for a cell block composed of cells having cell walls, cell caps, and reinforcing annular grooves in the cell walls, the attachment comprising an inverted U-shaped cell holder including a bight portion and a plurality of depending cell wall contacting arms, each of said arms having a reinforcing rib adapted to nest respectively in said cell grooves, and a contacting member disposed between said arms and carried by said holder in non-conductive relation therewith, said contactor being adapted to contact said cell caps, said holder and contactor being respectively resiliently engageable with said cell walls and cell caps to establish a parallel connection between said cells.

4. In the cell holder of claim 3, each of said arms terminating in an outwardly divergent lip portion acting to avoid scraping contact between said arms and said cell walls.

5. In combination in a battery a plurality of galvanic cells provided with cell caps serving as terminals thereof and a metal contactor plate adapted to provide solderless electrical positive engagement between cells, said plate having a plurality of resilient flanges integral therewith in contact with said cell caps of said cells, said resiliency of said flanges maintaining said flanges in solderless electrical positive engagement with said cells, said plate being electrically insulated from said cells except at the terminals thereof.

6. In combination in a battery a plurality of galvanic cells provided with cell caps serving as terminals thereof and a metal contactor plate adapted to provide solderless electrical contact between cells and to hold said cells in place in said battery, said plate having apertures therein for reception of said cell caps of said cells, said apertures being so formed as to define deflectable, resilient flanges about the perimeter of said apertures to provide positive electrical contact between said cell caps and the perimeter of said apertures, said plate being electrically insulated from said cells except at the terminals thereof.

References Cited in the file of this patent

UNITED STATES PATENTS

| | | |
|---|---|---|
| 467,240 | Schoenmehl | Jan. 19, 1892 |
| 796,517 | Jackson | Aug. 8, 1905 |
| 912,705 | Mason | Feb. 16, 1909 |
| 953,640 | Patterson | Mar. 29, 1910 |
| 1,594,486 | Baldwin et al. | Aug. 3, 1926 |
| 2,014,832 | Burgess | Sept. 17, 1935 |
| 2,151,193 | Diebel | Mar. 21, 1939 |

FOREIGN PATENTS

| | | |
|---|---|---|
| 425,317 | Great Britain | Mar. 12, 1935 |